(12) United States Patent
Tachihana (10) Patent No.: US 8,335,640 B2
(45) Date of Patent: Dec. 18, 2012

(54) NAVIGATION SYSTEM, METHOD FOR GUIDANCE ALONG GUIDE ROUTE, AND ROUTE GUIDANCE PROGRAM

(75) Inventor: Shinichi Tachihana, Iwaki (JP)

(73) Assignee: Alpine Electronics, Inc. (JP)

( * ) Notice: Subject to any disclaimer, the term of this patent is extended or adjusted under 35 U.S.C. 154(b) by 300 days.

(21) Appl. No.: 12/727,524

(22) Filed: Mar. 19, 2010

(65) Prior Publication Data

US 2010/0305846 A1    Dec. 2, 2010

(30) Foreign Application Priority Data

Jun. 1, 2009    (JP) ................. 2009-131705

(51) Int. Cl.
*G01C 21/00*    (2006.01)
(52) U.S. Cl. ...... 701/400; 701/25; 701/533; 342/357.23
(58) Field of Classification Search ........................ None
See application file for complete search history.

(56) References Cited

U.S. PATENT DOCUMENTS

| 6,184,823 | B1 * | 2/2001 | Smith et al. | 342/357.31 |
| 6,748,321 | B2 * | 6/2004 | Watanabe et al. | 701/418 |
| 7,925,428 | B2 * | 4/2011 | Han | 701/425 |
| 2002/0077746 | A1 * | 6/2002 | Zuber et al. | 701/209 |

FOREIGN PATENT DOCUMENTS

JP    2004-286518    10/2004

OTHER PUBLICATIONS

"A Novel Information Fusion Algorithm for GPS/INS Navigation System" by Zhao Xiaochuan et al., published Jun. 22-25, 2009; pp. 818-823.*

* cited by examiner

*Primary Examiner* — Luna Champagne
(74) *Attorney, Agent, or Firm* — Brinks Hofer Gilson & Lione (57) ABSTRACT

A navigation system for a vehicle includes an input unit configured to receive an input corresponding to a destination, a determining unit configured to determine if the input destination corresponds to a route that includes a ferry route or a rail-based route, a modifying unit configured to modify the input destination to a modified destination that corresponds to a termination of a road linked to the route or in the vicinity of a terminal of the route, when it is determined that the input destination corresponds to a location on the route. A route guidance unit is configured to search for a guide route to the modified destination and perform guidance along the guide route, wherein when the navigation system in the vehicle arrives at the termination of the road or in the vicinity thereof, or when the vehicle is positioned in the vicinity of the terminal, and the navigation system is turned off, and the route guidance unit determines that the vehicle has arrived at the destination.

15 Claims, 7 Drawing Sheets

NAVIGATION SYSTEM, METHOD FOR GUIDANCE ALONG GUIDE ROUTE, AND ROUTE GUIDANCE PROGRAM

PRIORITY CLAIM

This application claims the benefit of Japanese Patent Application No. 2009-131705, filed on Jun. 1, 2009, and which is incorporated by reference herein in its entirety.

BACKGROUND

1. Field of the Invention

This disclosure relates to a navigation system that searches for a guide route from the position of user's vehicle to a destination and performs guidance along the guide route, namely, guide the user to the destination along the guide route, and in particular, relates to a guidance operation of the navigation system when the guide route or destination includes a ferry route or a railroad.

2. Description of the Related Art

A navigation system supports guidance along a guide route including a ferry route or a railroad other than a road. For example, Japanese Unexamined Patent Application Publication No. 2004-286518 discloses a method for guidance along a guide route using a ferry route. In this case, map data stored in a navigation system includes ferry boarding and alighting place position data regarding ferry boarding and alighting places in various locations, ferry data regarding available ferries in various locations, and ferry route data regarding ferry routes between ferry boarding and alighting places. On the basis of the above-described data items, a ferry boarding position and a ferry alighting position are estimated and guidance along a guide route is performed.

Figure 1A:
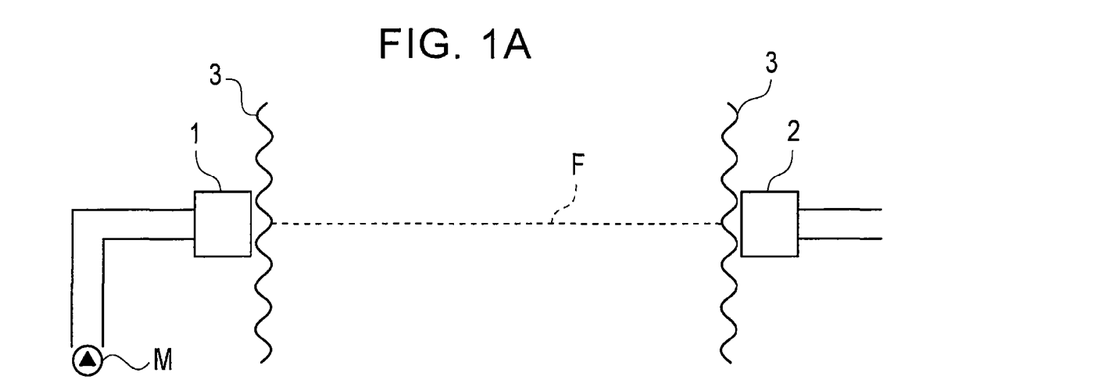
FIGS. 1A to 1C are diagrams illustrating an operation screen of a related-art navigation system, FIG. 1A illustrating a method for setting a destination on a ferry route in the related-art navigation system, FIG. 1B illustrating a guide route to the destination on the ferry route.

FIG. 1A illustrates an operation screen displayed during a destination setting operation of a related-art navigation system. When a user wants to use a ferry route or board a ferry, the user can select a ferry route as a destination (including a passing point). If the user has known the name of a ferry route or a ferry route terminal, the user can retrieve a destination using text on a menu screen. However, if the user does not know the name thereof, a map scroll screen as shown in FIG. 1A is displayed. The user selects a desired ferry route or a location on the ferry route while scrolling the map screen. Particularly, in Europe and the United States, the names of roads are often used in retrieving and setting a destination. A ferry route can also be selected as a type of road name.

The map screen includes a departure terminal 1 of the ferry route, an arrival terminal 2 thereof, boundaries 3 between land and water, a mark M indicating the position of user's vehicle (hereinafter, also referred to as "vehicle position"), and a ferry route F indicated by a broken line. When using the ferry route, the user selects a place on or near the ferry route F. Consequently, the navigation system recognizes that the ferry route F is set as a destination G, searches for a guide route Y from the vehicle position (or a starting location) to the destination G, and performs guidance along the guide route Y.

Figure 1B:
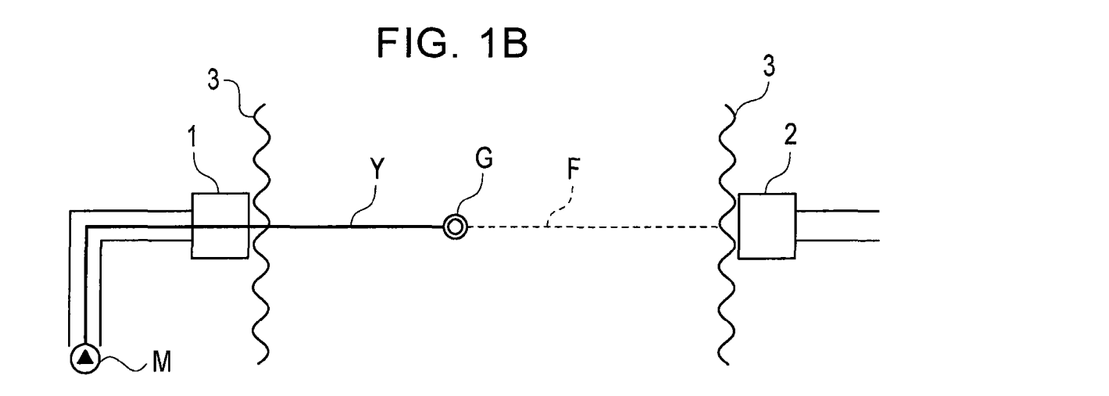
Figure 1C:
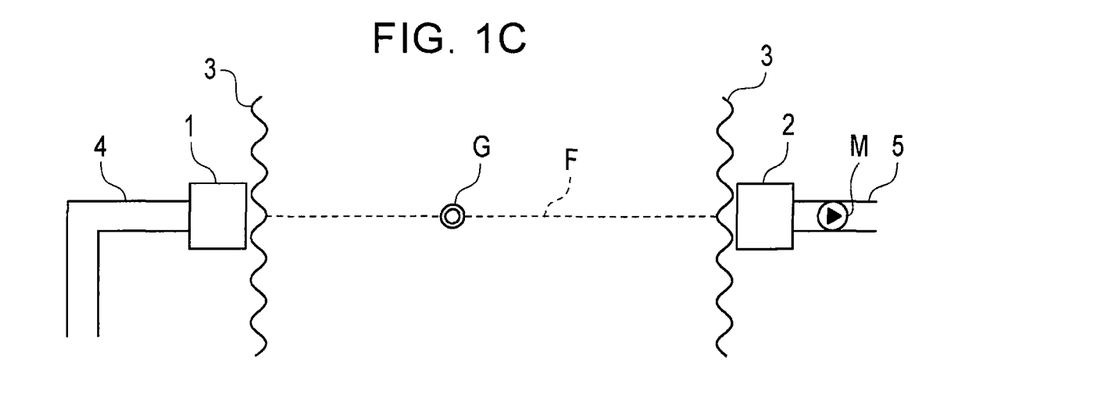

In the case where a location on the ferry route is set to a destination, however, the ignition of the user's vehicle is turned off while the vehicle is on board the ferry. Unfortunately, therefore, the navigation system cannot determine whether the vehicle has reached the destination G on the ferry route. Disadvantageously, when the ignition of the vehicle is turned on a road 5 linked to the arrival terminal 2 of the ferry route, the navigation system performs rerouting (re-searching) to again search for a route from the vehicle position M to the destination G, as shown in FIG. 1C.

SUMMARY

Accordingly, it is an object of one embodiment the present invention to provide a navigation system capable of certainly determining the arrival of user's vehicle at a destination even when the destination includes a route by water or rail, a method for guidance along a guide route, and a route guidance program.

According to an embodiment of the present invention, a navigation system includes the following elements. An input unit allows input of a destination. A determining unit determines whether the input destination is a location on a route by water or rail. A modifying unit modifies the input destination to the termination of a road linked to the route when it is determined that the input destination is a location on the route. A route guidance unit searches for a guide route to the modified destination and performs guidance along the guide route searched for. When user's vehicle arrives at the termination or in the vicinity thereof, the route guidance unit determines that the vehicle has arrived at the destination.

Preferably, the modifying unit compares a distance from the input destination to a departure terminal of the route and that to an arrival terminal of the route and modifies the input destination to the termination of a road linked to the departure or arrival terminal that is closer to the input destination.

According to another embodiment of the present invention, a navigation system includes the following elements. An input unit allows input of a destination. A determining unit determines whether the input destination is a location on a route by water or rail. A presenting unit presents a selection screen which allows a user to select either of a departure terminal and an arrival terminal of the route when it is determined that the input destination is a location on the route. A modifying unit modifies the input destination to the termination of a road linked to the selected departure or arrival terminal when the user selects the departure or arrival terminal in response to the presenting unit. A route guidance unit searches for a guide route to the modified destination and performs guidance along the guide route searched for. When user's vehicle arrives at the termination or the vicinity thereof, the route guidance unit determines that the vehicle has arrived at the destination.

According to further another embodiment of the present invention, a navigation system includes the following elements. An input unit allows input of a destination. A determining unit determines whether the input destination is a location on a route by water or rail. A modifying unit modifies the input destination to a terminal of the route when it is determined that the input destination is a location on the route. A route guidance unit searches for a guide route to the modified destination and performs guidance along the guide route searched for. When user's vehicle is positioned in the vicinity of the terminal of the route and the ignition of the vehicle is turned off, the route guidance unit determines that the vehicle has arrived at the destination.

According to still another embodiment of the present invention, a navigation system includes the following elements. An input unit allows input of a destination. A determining unit determines whether the input destination is a location on a route by water or rail. A route guidance unit searches for a guide route on the basis of the input destination and performs guidance along the guide route searched for. When user's vehicle arrives at the termination of a road linked to the route on the condition that it is determined that the input destination is a location on the route, the route guidance unit determines that the vehicle has arrived at a destination and presents a reference route from the termination to the input destination.

Preferably, the termination of the road excludes a road on which vehicle travel is not permitted. Preferably, the termination of the road excludes a road that intersects a road linked to the route.

According to another embodiment of the present invention, there is provided a method for guidance along a guide route in a navigation system, the method includes the steps of allowing input of a destination, determining whether the input destination is a location on a route by water or rail, modifying the input destination to the termination of a road linked to the route when it is determined that the input destination is a location on the route, searching for a guide route to the modified destination to perform guidance along the guide route searched for, and when user's vehicle arrives at the termination or the vicinity thereof, determining that the vehicle has arrived at the destination and terminating the guidance.

According to further another embodiment of the present invention, there is provided a method for guidance along a guide route in a navigation system, the method including the steps of allowing input of a destination, determining whether the input destination is a location on a route by water or rail, presenting a selection screen which allows a user to select either of a departure terminal and an arrival terminal of the route when it is determined that the input destination is a location on the route, modifying the input destination to the termination of a road linked to the selected departure or arrival terminal when the user selects the departure or arrival terminal in response to the presented selection screen, searching for a guide route to the modified destination to perform guidance along the guide route searched for, and when user's vehicle arrives at the termination or the vicinity thereof, determining that the vehicle has arrived at the destination and terminating the guidance.

According to still another embodiment of the present invention, there is provided a method for guidance along a guide route in a navigation system, the method includes the steps of allowing input of a destination, determining whether the input destination is a location on a route by water or rail, modifying the input destination to the vicinity of a terminal of the route when it is determined that the input destination is a location on the route, searching for a guide route to the modified destination to perform guidance along the guide route searched for, and when user's vehicle is positioned in the vicinity of the terminal of the route and the ignition of the vehicle is turned off, determining that the vehicle has arrived at the destination and terminating the guidance.

According to further another embodiment of the present invention, there is provided a method for guidance along a guide route in a navigation system, the method including the steps of allowing input of a destination, determining whether the input destination is a location on a route by water or rail, searching for a guide route on the basis of the input destination to perform guidance along the guide route searched for, determining that user's vehicle has arrived at a destination when the vehicle arrives at the termination of a road linked to the route on the condition that it is determined that the input destination is a location on the route, and presenting a reference route from the termination to the input destination.

According to another embodiment of the present invention, there is provided a program that allows a navigation system to perform guidance along a guide route, the program including the steps of allowing input of a destination, determining whether the input destination is a location on a route by water or rail, modifying the input destination to the termination of a road linked to the route when it is determined that the input destination is a location on the route, searching for a guide route to the modified destination to perform guidance along the guide route searched for, and when user's vehicle arrives at the termination or the vicinity thereof, determining that the vehicle has arrived at the destination and terminating the guidance.

According to further another embodiment of the present invention, there is provided a program that allows a navigation system to perform guidance along a guide route, the program including the steps of allowing input of a destination, determining whether the input destination is a location on a route by water or rail, presenting a selection screen which allows a user to select either of a departure terminal and an arrival terminal of the route when it is determined that the input destination is a location on the route, modifying the input destination to the termination of a road linked to the selected departure or arrival terminal when the user selects the departure or arrival terminal in response to the presented selection screen, searching for a guide route to the modified destination to perform guidance along the guide route searched for, and when user's vehicle arrives at the termination or the vicinity thereof, determining that the vehicle has arrived at the destination and terminating the guidance.

According to still another embodiment of the present invention, there is provided a program that allows a navigation system to perform guidance along a guide route, the program including the steps of allowing input of a destination, determining whether the input destination is a location on a route by water or rail, modifying the input destination to the vicinity of a terminal of the route when it is determined that the input destination is a location on the route, searching for a guide route to the modified destination to perform guidance along the guide route searched for, and when user's vehicle is positioned in the vicinity of the terminal of the route and the ignition of the vehicle is turned off, determining that the vehicle has arrived at the destination and terminating the guidance.

According to further another embodiment of the present invention, there is provided a program that allows a navigation system to perform guidance along a guide route, the program including the steps of allowing input of a destination, determining whether the input destination is a location on a route by water or rail, searching for a guide route on the basis of the input destination to perform guidance along the guide route searched for, determining that user's vehicle has arrived at a destination when the vehicle arrives at the termination of a road linked to the route on the condition that it is determined that the input destination is a location on the route, and presenting a reference route from the termination to the input destination.

According to the embodiments of the present invention, the arrival of user's vehicle at a destination can be certainly determined and unnecessary rerouting (re-searching) can be prevented. Furthermore, a destination can be set in consideration of user's intention.

DESCRIPTION OF THE PREFERRED EMBODIMENTS

Embodiments of the present invention will be described in detail below with reference to the drawings.

Figure 2:
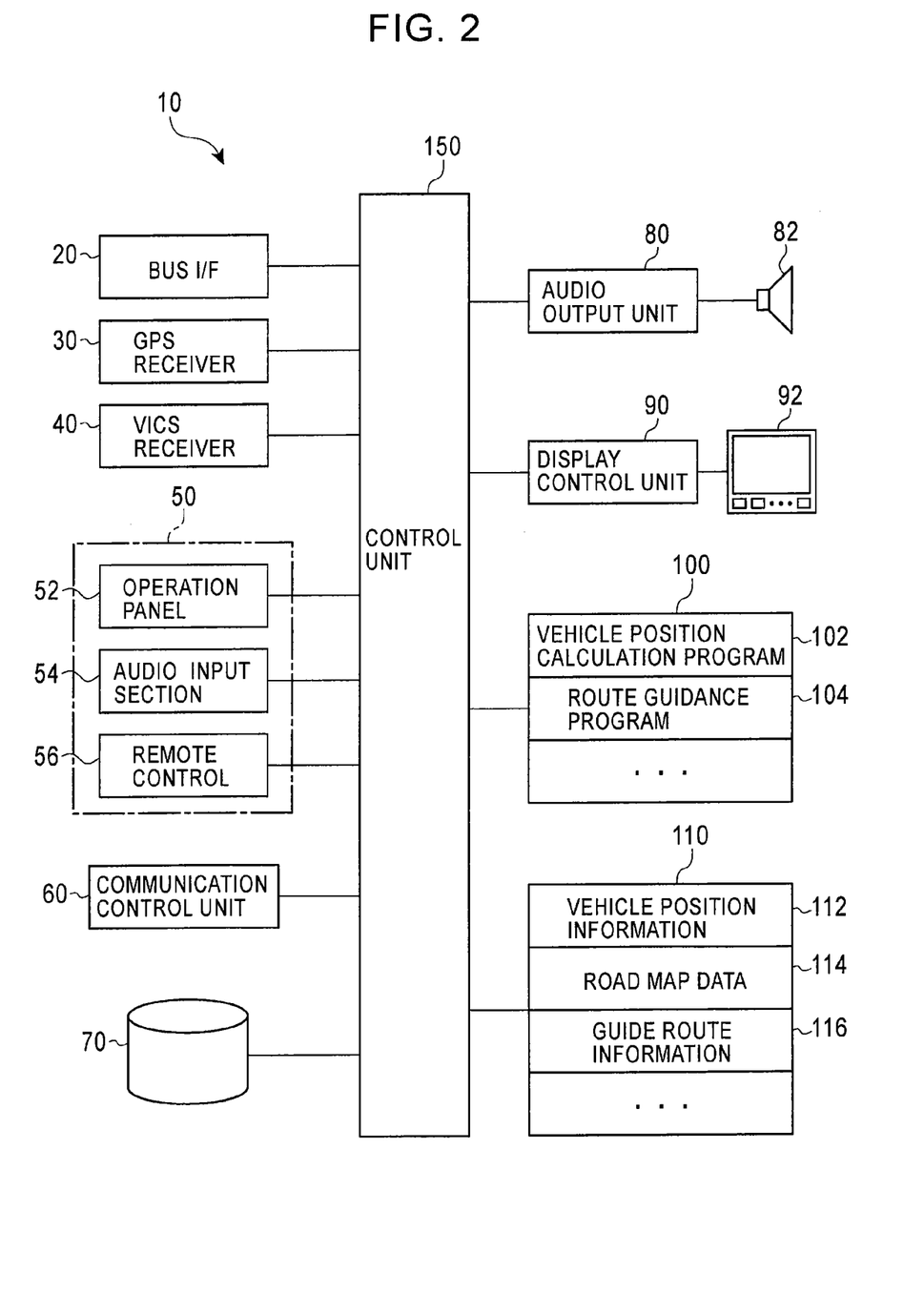
FIG. 2 is a block diagram illustrating a navigation system according to an embodiment of the present invention.

FIG. 2 is a block diagram illustrating a typical configuration of a navigation system according to an embodiment of the present invention. The navigation system, indicate at 10, includes a bus interface (I/F) 20 that receives a signal regarding a state of user's vehicle from a bus in the vehicle, a GPS receiver 30 that receives a signal from a global positioning system (GPS) satellite to detect the position of the vehicle, a VICS receiver 40 that receives traffic information distributed from the Vehicle Information Communication System (VICS) center, an input unit 50 that accepts an input from the user, a communication control unit 60 that performs data communication with an external device by wire or wireless, a storage unit 70 including a storage medium, such as a large-capacity hard disk, an audio output unit 80 that allows audio output from a speaker 82, a display control unit 90 that allows a display 92 to display an image, e.g., a road map, a program memory 100 that stores programs, a data memory 110 that temporarily stores data, and a control unit 150 that executes a program to control the components.

The bus I/F 20 receives detection signals from self-contained navigation sensors (e.g., a speed sensor, an acceleration sensor, a gyro sensor, and the like), a signal indicating the ON or OFF state of a parking brake, a signal indicating the ON/OFF state of the ignition functioning as a device for turning the engine on or off, and a signal indicating a gear position, and supplies the signals to the control unit 150. The VICS receiver 40 receives traffic information distributed from the VICS center via an optical beacon, a radio beacon, or FM multiplex broadcast and supplies the information to the control unit 150. The input unit 50 includes an operation panel 52 that allows touch input on the display 92, an audio input unit 54 that allows audio input, and a remote control 56.

The storage unit 70 stores road map data necessary for navigation. The road map data includes link data for road identification, node data for intersection identification, and facility data for identification of a point of interest (PIO), such as a facility. The link data includes the type of each road, the name thereof, the width thereof, regulation in the road, the coordinates of the start node of the road, and those of the end node thereof. The node data includes, for example, information indicating the connection relationship between linked nodes relative to the start nodes and the end nodes and information indicating the type of intersection.

The road map data further includes route information regarding ferry routes and railroads other than roads. Information regarding ferry routes includes the names of departure and arrival terminals, serving as boarding and alighting places, of each ferry route, position information relevant to these terminals, information for identifying roads (link data) linked to the terminals, and schedule information relevant to the ferry route. The schedule information relevant to each ferry route includes, for example, information indicating the distance between the departure terminal and the arrival terminal, information about travel time, and information indicating the presence or absence of a stopover.

The program memory 100 stores, for example, a position calculation program 102 for calculating the vehicle position on the basis of detection signals from the self-contained navigation sensors and the GPS receiver 30, a route guidance program 104 for searching for an optimum guide route from the vehicle position or another starting location to a destination to perform guidance along the guide route. The data memory 110 stores, for example, vehicle position information 112 indicating the vehicle position calculated by the vehicle position calculation program 102, road map data 114 which is concerned with an area relevant to the vehicle position and is read from the storage unit 70, and guide route information 116 indicating a guide route searched for using the route guidance program 104.

Figure 3:
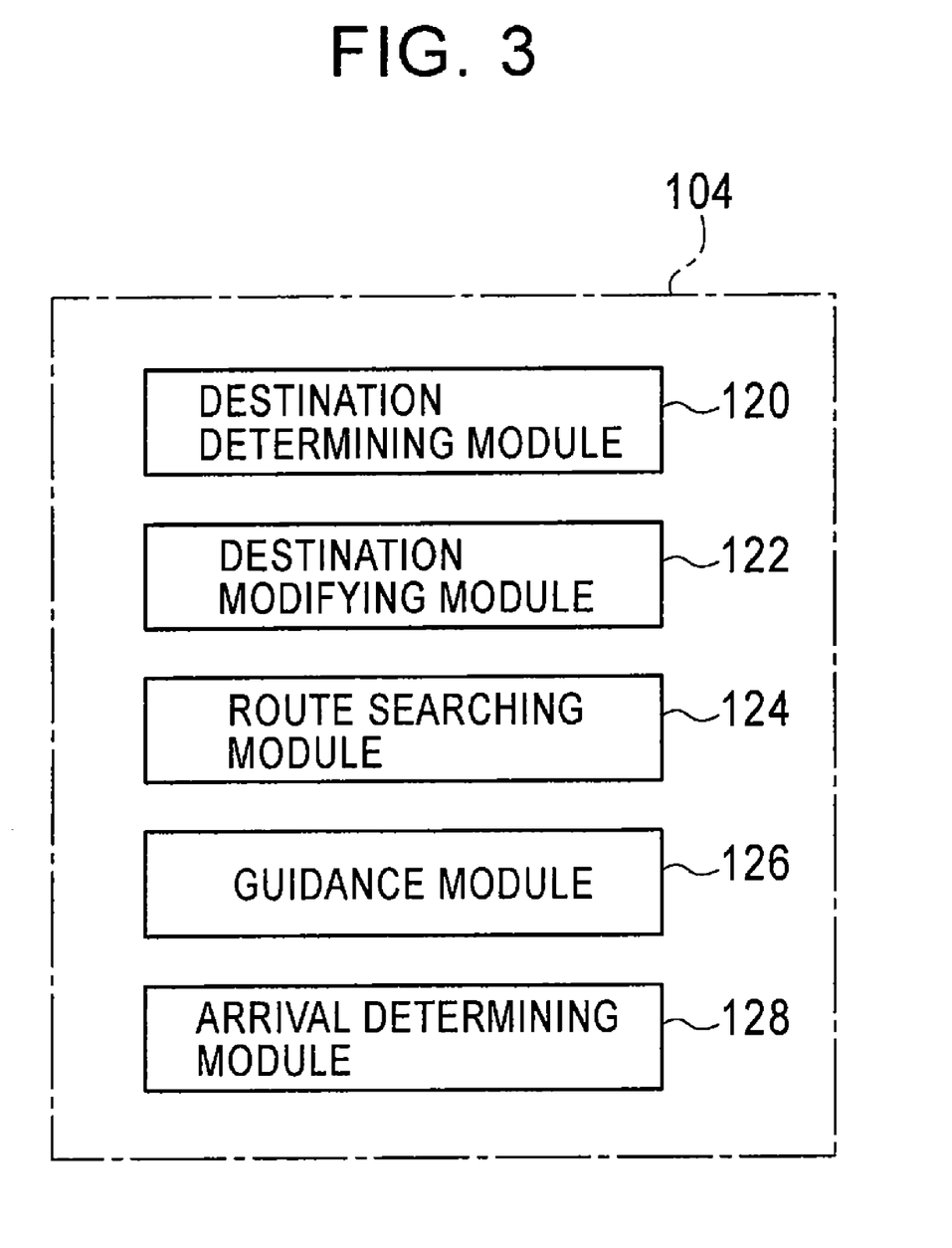
FIG. 3 is a functional block diagram illustrating a route guidance program.

Route guidance performed by the navigation system will now be described. FIG. 3 is a functional block diagram of the route guidance program 104. The route guidance program 104 includes a destination determining module 120 to determine whether a destination input by the user corresponds to a location on a ferry route, a destination modifying module 122 to automatically modify the destination when the input destination is determined as a location on the ferry route, a route searching module 124 to search for a guide route to the destination, a guidance module 126 for performing guidance along the guide route, and an arrival determining module 128 to determine whether the vehicle has arrived at the destination.

For example, assuming that the user selects a location on a ferry route on a map scroll screen using a cursor or a touch panel, when the selected location (latitude and longitude) is in a predetermined range from the ferry route, the destination determining module 120 determines that the ferry route is selected as a destination. As for another input case, when a location on the ferry route is selected on a menu screen, the destination determining module 120 similarly determines that the ferry route is selected as a destination. In this specification, the term "destinations" also include a passing point and a stopover.

When it is determined that the input destination is a location on the ferry route, the destination modifying module 122 automatically modifies the destination to the termination (end node) of a road linked to the departure or arrival terminal of the ferry route. Preferably, the destination modifying module 122 compares a distance from the location, serving as the input destination, on the ferry route to the departure terminal of the ferry route and a distance from the location to the arrival terminal. In this case, travel times may be compared instead of the distances. The destination modifying module 122 selects the terminal closer to the destination and modifies the destination to the termination of the road linked to the terminal.

The route searching module 124 searches for a guide route from the vehicle position or a specified starting location to the destination. When the destination is modified, a guide route to the termination of a road linked to the departure or arrival terminal is searched for. A known searching method is available. A route can be searched for so that a cost set for link is minimized. The guidance module 126 reads a road map regarding an area relevant to the vehicle position from the storage unit 70 in accordance with the movement of the vehicle and allows the display 92 to display the relevant map. In addition, the guidance module 126 performs guidance in the travelling direction at an intersection or the like, as necessary.

The arrival determining module 128 determines on the basis of the calculated vehicle position whether the vehicle has arrived at the destination. In the case where the destination is modified to the termination of the road linked to the departure or arrival terminal, a determination is made as to whether the vehicle has arrived at the termination of the road. When the arrival determining module 128 determines that the vehicle has arrived at the destination, the guidance module 126 deletes the searched-for guide route and terminates the guidance. The user is notified of the termination of the guidance in the form of audio output or text displayed on the display.

Figure 4:
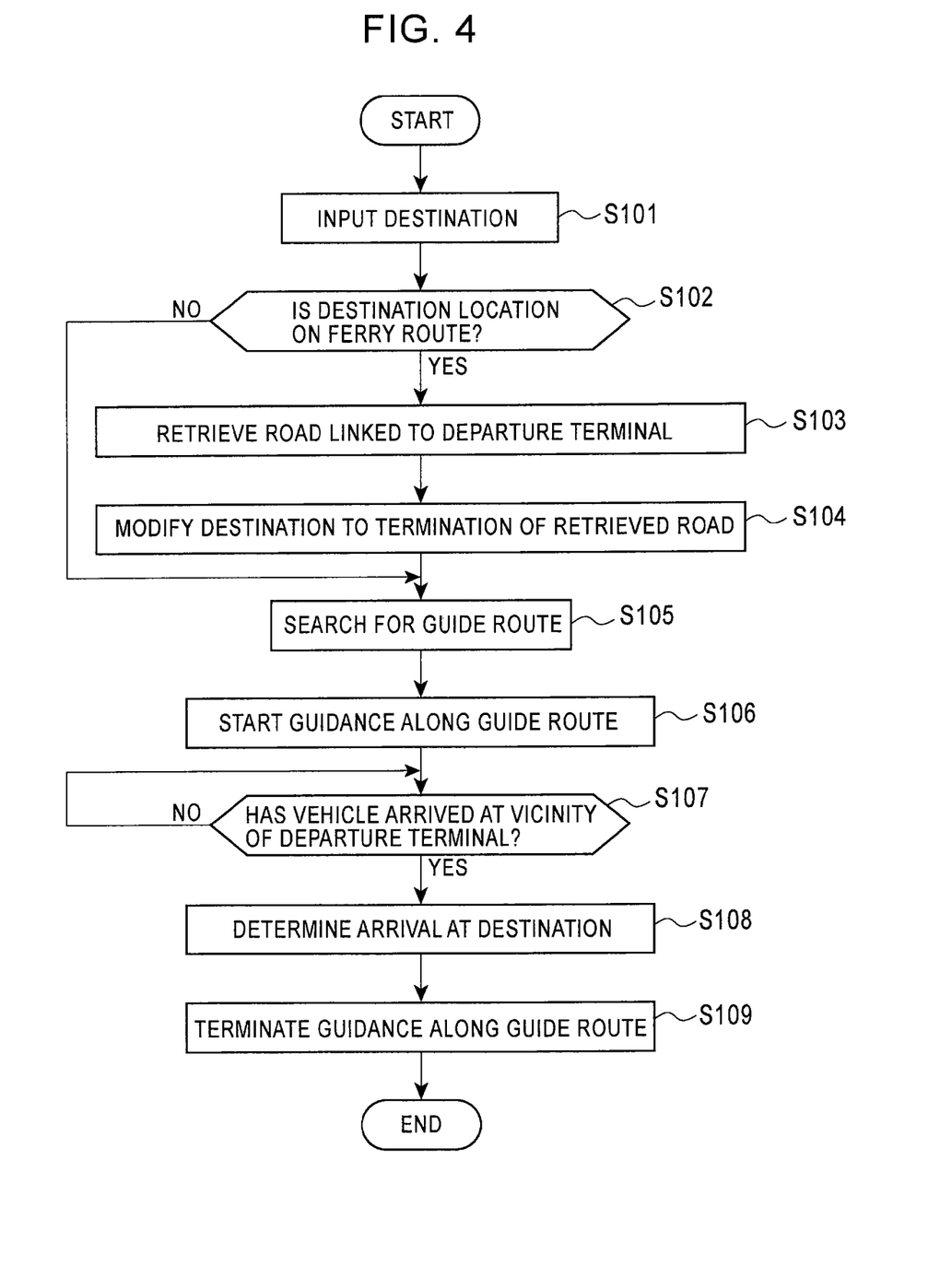
FIG. 4 is a flowchart illustrating a destination setting operation of the route guidance program according to a first embodiment of the present invention.

A guidance operation of the navigation system according to the first embodiment of the present invention will now be described with reference to a flowchart of FIG. 4. FIG. 4 illustrates the guidance operation performed when it is determined that a destination is a location on a ferry route. When the user inputs a destination (step S101), the destination determining module 120 determines whether the destination is a location on a ferry route (step S102). As for determination, when the location selected by the user is in the vicinity of a ferry route, alternatively, when the selected location is closer to the ferry route than another road, it is determined that the destination is a location on the ferry route, as described above.

When it is determined that the input destination is the location on the ferry route, the destination modifying module 122 specifies the departure terminal linked to the ferry route and retrieves a road linked to the specified departure terminal (step S103). Then, the destination modifying module 122 automatically modifies the destination to the termination (end node) of the retrieved road (step S104). Note that roads having such a termination are roads on which vehicle travel is permitted and exclude vehicle-free roads on which vehicle travel is not permitted. The vehicle-free roads include, for example, a pedestrian road and a road which vehicles are prohibited from entering. The reason is that if a destination is set on such a vehicle-free road, whether the vehicle has arrived at the destination is not be certainly determined in some cases. Information indicating whether vehicle travel is permitted on a target road is obtained from information regarding the type of each road and regulation information included in the link data. Furthermore, if an intersection on which vehicle travel is permitted exists between the departure terminal and a vehicle-free road or a traffic regulated road, such an intersection is not set as the termination of a road. The reason is that if such an intersection is set to a destination, whether the vehicle has arrived at the destination is not determined in some cases.

The route searching module 124 searches for a guide route to the termination of the road linked to the departure terminal from the vehicle position (step S105). The guidance module 126 starts guidance along the guide route (step S106). The arrival determining module 128 compares the calculated vehicle position with the modified destination. When the vehicle arrives at the destination or the vicinity of the destination (step S107), the arrival determining module 128 determines the arrival of the vehicle at the destination (step S108). When it is determined that the vehicle has arrived at the destination, the guidance module 126 notifies the user of the termination of the guidance along the guide route (step S109). When it is determined that the input destination is not a location on any ferry route, the system proceeds to step S105 and normal guidance is performed.

Figure 5:
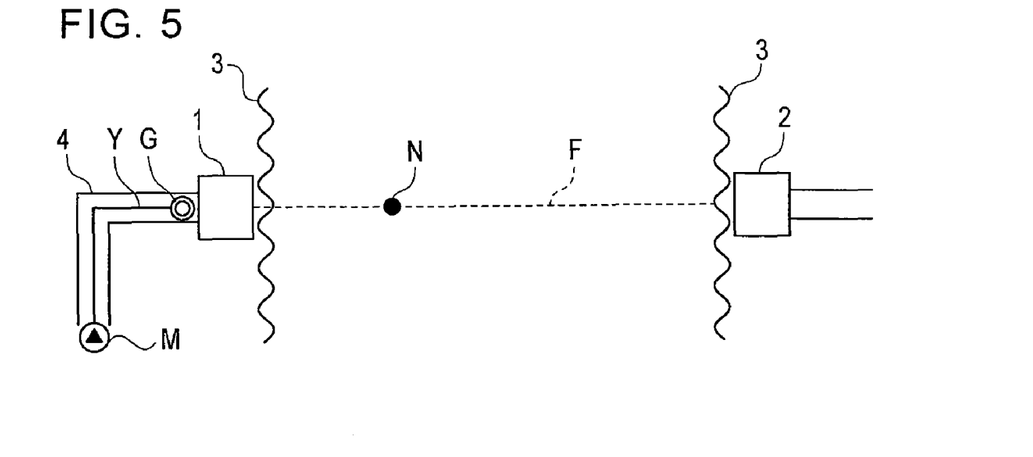
FIG. 5 is a diagram explaining a destination modifying operation in accordance with the first embodiment.

FIG. 5 is a diagram explaining an operation of modifying a destination. For example, it is assumed that a destination N is input so as to be located on a ferry route F or in the vicinity of the ferry route on the map scroll screen illustrated in FIG. 1B. In this case, it is determined that the input destination N is located on the ferry route. As illustrated in FIG. 5, the input destination N is automatically modified to the end node of a road 4 linked to the departure terminal 1, or the connection point between the road 4 and the departure terminal 1. At this time, the navigation system notifies the user of the modification of the destination N by audio output or the like, thus reducing user's uncomfortable feeling. When the modified destination, indicated at G, is set, a guide route Y from the vehicle position M to the destination G is searched for. When the vehicle reaches the termination of the road 4 on which the vehicle can be traveled, it is determined that the vehicle has arrived at the destination G. The guidance operation is terminated.

Figure 6:
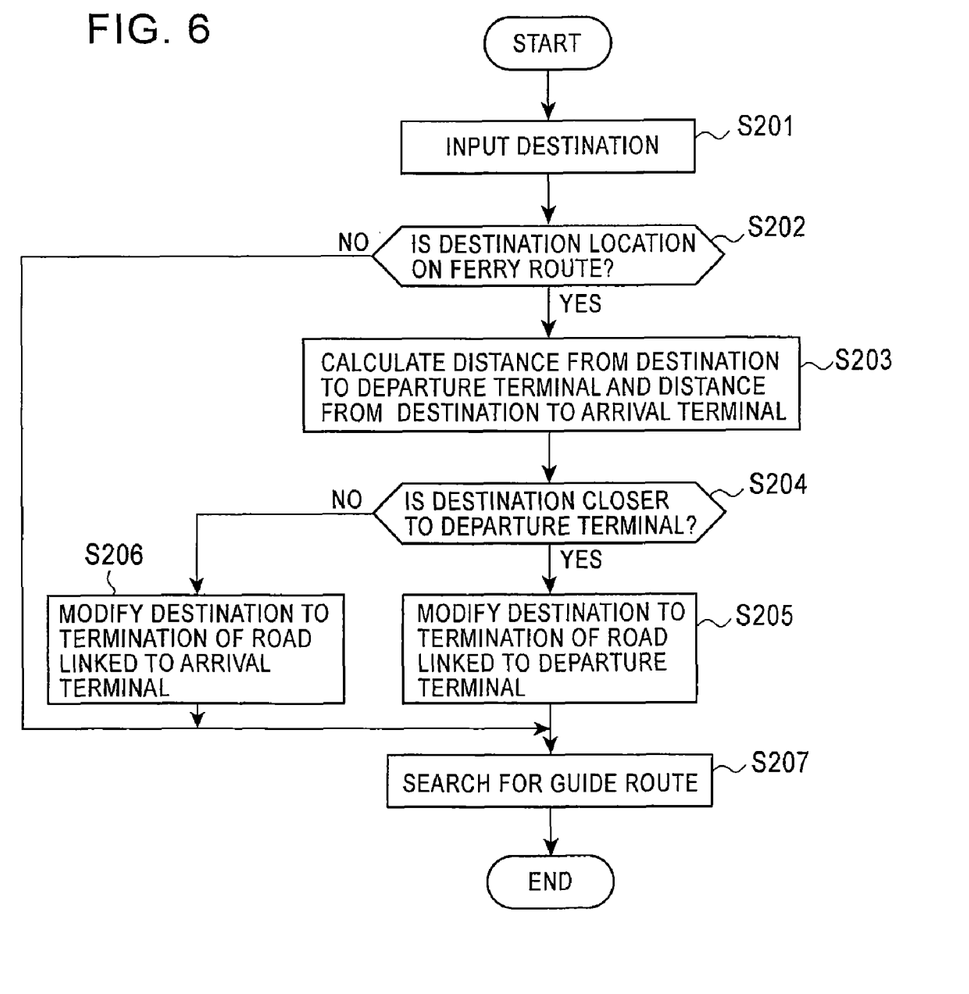
FIG. 6 is a flowchart illustrating a guidance operation of a navigation system according to a second embodiment of the present invention.

A second embodiment of the present invention will now be described. In the first embodiment, a destination is modified to the termination of a road linked to a departure terminal. In the present embodiment, a destination is modified in consideration of user's intention. FIG. 6 is a flowchart illustrating a guidance operation in accordance with the second embodiment. When the user inputs a destination (step S201), the destination determining module 120 determines whether the destination is a location on a ferry route (step S202).

When it is determined that the destination is a location on the ferry route, the destination modifying module 122 calculates a distance L1 from the input destination to a departure terminal and a distance L2 from the input destination to an arrival terminal (step S203), and compares the distances L1 and L2 (step S204) to select the terminal that is at a shorter distance from the destination. In this case, the destination modifying module 122 may compare the linear distance L1 to the departure terminal and the linear distance L2 to the arrival terminal. Alternatively, the destination modifying module 122 may compare the time of travel to the departure terminal and that to the arrival terminal.

When the input destination is closer to the departure terminal, the destination is modified to the end of a road linked to the departure terminal (step S205). When the destination is closer to the arrival terminal, the destination is modified to the termination of a road linked to the arrival terminal (step S206). The route searching module 124 searches for a guide route to the modified destination (step S207).

Figure 7A:
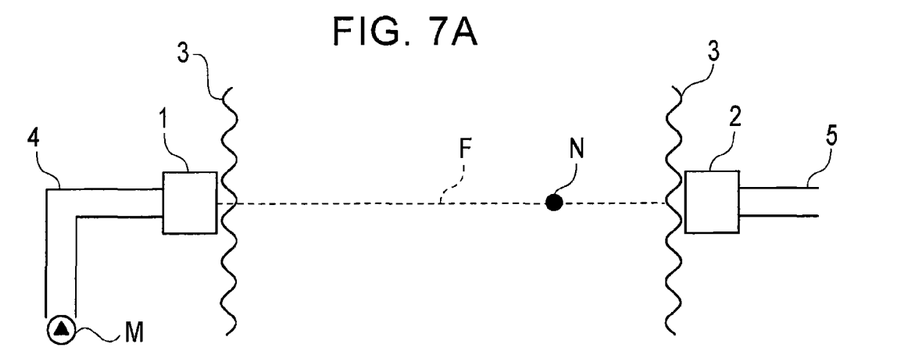
FIGS. 7A and 7B are diagrams explaining a destination modifying operation in accordance with the second embodiment.
Figure 7B:
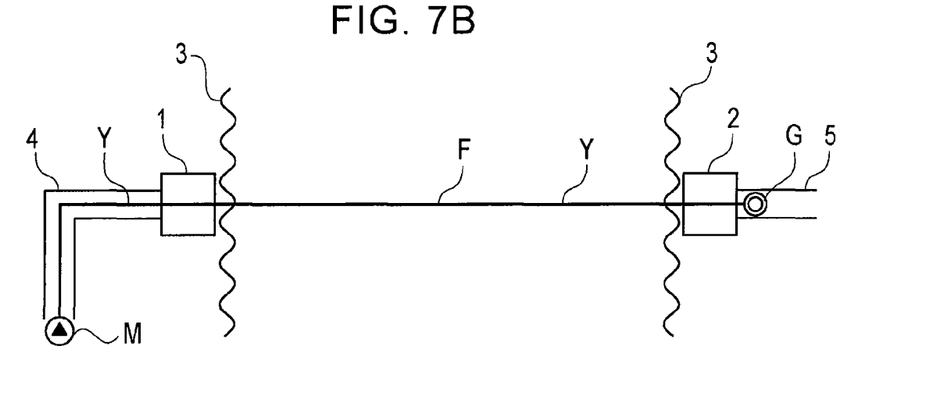

FIGS. 7A and 7B are diagrams explaining an operation of modifying a destination in accordance with the second embodiment. When an input destination N is closer to the arrival terminal 2, as illustrated in FIG. 7A, the destination N is automatically modified to a destination G at the termination of a road 5 linked to the arrival terminal 2, or the connection point between the road 5 and the arrival terminal 2, as illustrated in FIG. 7B. A guide route Y from user's vehicle position M to the modified destination G is searched for.

While the vehicle travels on a ferry route, namely, when the vehicle is carried on a ferry, the ignition of the vehicle is in the OFF state. When the vehicle is unloaded from the ferry, the ignition is turned on. The navigation system calculates the vehicle position in response to turning the ignition on. Since the calculated vehicle position is on the modified destination G or in the vicinity thereof, the arrival can be certainly determined.

According to the second embodiment, an input destination can be modified to the termination of a road close to the destination. Advantageously, a guide route that more nearly suits user's requirements can be searched for as compared to the first embodiment in which a destination is modified to a fixed location.

Figure 8:
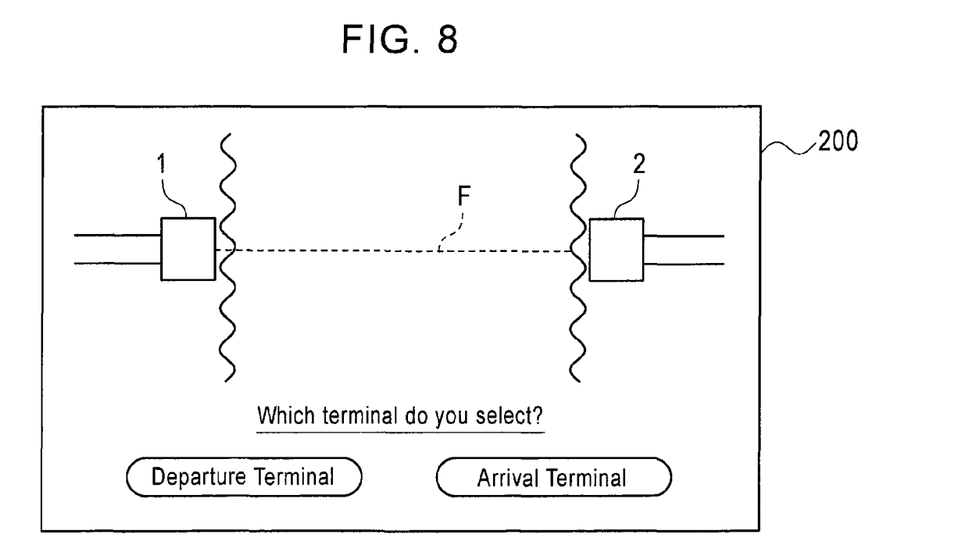
FIG. 8 illustrates a selection screen of a navigation system according to a third embodiment of the present invention.

A third embodiment of the present invention will now be described. According to the third embodiment, when it is determined that an input destination is a location on a ferry route, the user is permitted to select a location to which the destination is modified. When it is determined that an input destination is a location on a ferry route, the destination modifying module 122 allows the display 92 to display a selection screen 200 that asks the user which of the departure and arrival terminals the user wants to modify the destination to. When the user selects either of the departure and arrival terminals in response to the selection screen 200, the destination modifying module 122 modifies the destination to the termination of a road linked to the selected terminal. According to the third embodiment, the user selects either of the terminals in response to the selection screen, so that the user can recognize that the destination is modified. In this case, the selection screen prompts the user to select either of the terminals. The selection screen may prompt the user to select either of roads linked to the departure or arrival terminal.

Figure 9:
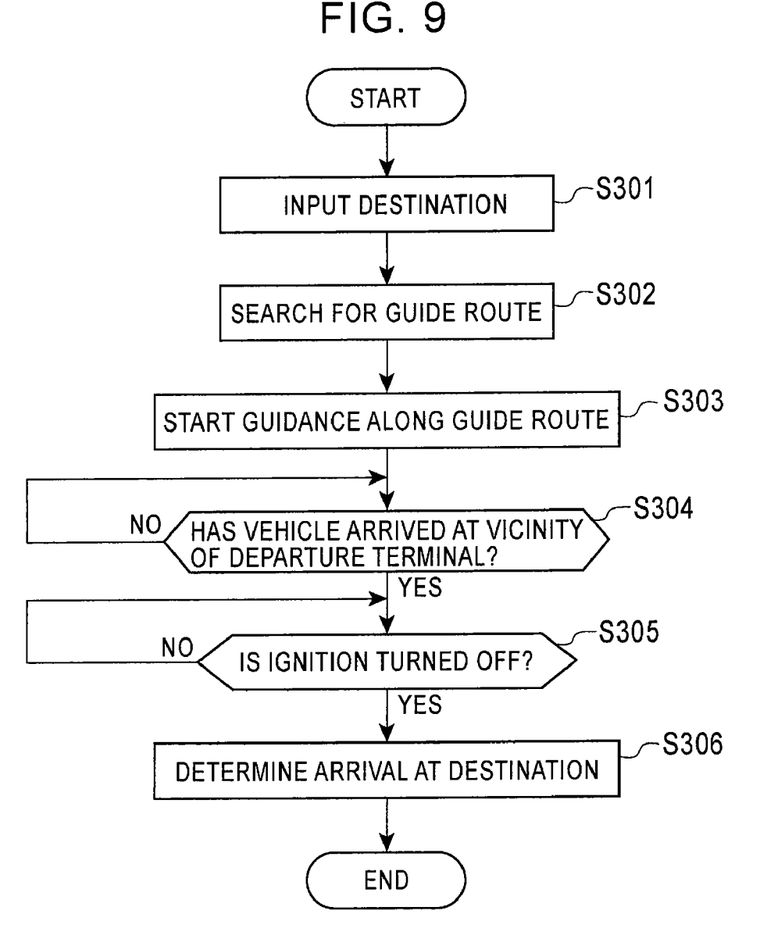
FIG. 9 is a flowchart illustrating a guidance operation of a navigation system according to a fourth embodiment of the present invention.

A fourth embodiment of the present invention will now be described with reference to a flowchart of FIG. 9. According to the fourth embodiment, whether user's vehicle has arrived at a destination is determined in response to turning off the ignition of the engine as a trigger. When the user inputs a destination (step S301), the route searching module 124 searches for a guide route to the destination (step S302). The guidance module 126 performs guidance to the destination along the guide route (step S303).

The arrival determining module 128 determines whether the vehicle has arrived in the vicinity of a departure terminal (step S304). For example, when the vehicle position is at a predetermined distance from the departure terminal, it is determined that the vehicle is in the vicinity of the departure terminal. In addition, the arrival determining module 128 monitors ignition ON/OFF information received from the bus I/F 20. When detecting the turn-off of the ignition, the arrival determining module 128 forcibly determines that the vehicle has arrived at the destination (step S306). The reason is that when the engine of the vehicle is stopped in the vicinity of the departure terminal, it is expected that the vehicle will be boarded onto a ferry. When it is determined that the vehicle has arrived at the destination, the guidance module 126 deletes the guide route and terminates the guidance.

According to the fourth embodiment, whether the vehicle has arrived at a destination can be determined on the basis of information indicating switching the ignition on or off. Advantageously, even if the destination is not necessarily modified to the termination of a road linked to a terminal, whether the vehicle has arrived at the destination can be determined. Certainly, the fourth embodiment can be combined with the first or third embodiment.

A fifth embodiment of the present invention will now be described. According to the fifth embodiment, a guide route from user's vehicle position to the termination of a road linked to a departure terminal is searched for and a route from the departure terminal to a destination is presented as a reference route.

Figure 10:
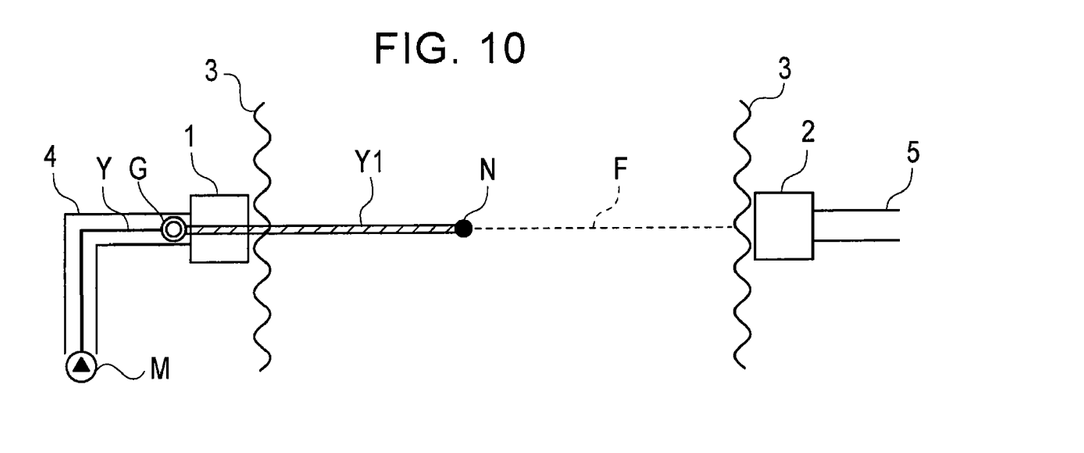
FIG. 10 is a diagram explaining a guidance operation of a navigation system according to a fifth embodiment of the present invention.

FIG. 10 is a diagram explaining a guidance operation in accordance with the fifth embodiment of the present invention. When the user inputs a location on a ferry route as a destination N, the destination modifying module 122 modifies the destination N to a destination G at the termination of a road linked to the departure terminal 1. The route searching module 124 searches for a guide route Y from the position of user's vehicle to the destination G and also searches for a reference route Y1 from the modified destination G to the input destination N. The guidance module 126 displays the guide route Y on a road map and also displays the reference route Y1 such that the reference route Y1 can be distinguished from the guide route Y. When the vehicle arrives at the vicinity of the destination G, the arrival determining module 128 determines that the vehicle has arrived at the destination G and guidance is actually terminated. At this time, the reference route Y1 from the destination G to the destination N is provided on the display.

According to the fifth embodiment, whether user's vehicle has arrived at a modified destination is determined and a reference route to an input destination is provided. Advantageously, the user can confirm scheduled time of arrival at the input destination or a travel route to the input destination on the basis of a route from the termination of a road to a ferry boarding and alighting place indicated by the reference route and a ferry route.

In the above-described embodiments, the ferry route has been illustrated. The present invention can be similarly applied to a car train that transports vehicles by rail. In addition, although the case where the ferry route is directly linked from the departure terminal to the arrival terminal in the above-described embodiments, the ferry route may be linked from the departure terminal through an intermediate terminal (e.g., an island) to the arrival terminal.

While the present invention has been described in detail with reference to preferred embodiments, it should be understood that the present invention is not limited to specific embodiments and various changes and modifications can be made without departing from the scope and spirit of the invention as defined in the appended claims.

What is claimed is:

1. A navigation system for a vehicle, comprising:
    a storage medium for storing programs that control components of the navigation system;
    a control unit that executes the programs;
    an input unit configured to receive an input corresponding to a destination;
    a determining unit configured to determine if the input destination corresponds to a water-based route or a rail-based route;
    a modifying unit configured to modify the input destination to be a modified destination that corresponds to a termination of a road linked to the route or in the vicinity of an arrival terminal or a departure terminal of the route, when it is determined that the input destination corresponds to a location on the route; and
    a route guidance unit configured to search for a guide route to the modified destination and perform guidance along the guide route, wherein,
    when the navigation system in the vehicle arrives at the termination of the road or in the vicinity thereof, or when the vehicle is positioned in the vicinity of the terminal, and the navigation system is turned off, the route guidance unit determines that the vehicle has arrived at the destination.

2. The system according to claim 1, wherein the modifying unit compares a distance from the input destination to the departure terminal of the route and compares a distance from the input destination to the arrival terminal of the route, and modifies the input destination to be the termination of a road linked to the closer of the departure terminal or the arrival terminal.

3. The system according to claim 1, wherein the termination of the road excludes a road on which vehicle travel is not permitted.

4. The system according to claim 1, wherein the termination of the road excludes a road that intersects a road linked to the route.

5. A navigation system for a vehicle, comprising:
a storage medium for storing programs that control components of the navigation system;
a control unit that executes the programs;
an input unit configured to receive an input corresponding to a destination;
a determining unit configured to determine if the input destination corresponds to a water-based route or a rail-based route;
a presenting unit configured to display a selection screen which allows a user to select a departure terminal or an arrival terminal of the route, when it is determined that the input destination is a location on the route;
a modifying unit configured to modify the input destination to be the termination of a road linked to the selected departure terminal or arrival terminal when the user selects the departure terminal or the arrival terminal, respectively; and
a route guidance unit configured to search for a guide route to the modified destination, and perform guidance along the guide route, wherein
when the navigation system in the vehicle arrives at the termination of the road or the vicinity thereof, the route guidance unit determines that the vehicle has arrived at the destination.

6. The system according to claim 5, wherein the termination of the road excludes a road on which vehicle travel is not permitted.

7. The system according to claim 5, wherein the termination of the road excludes a road that intersects a road linked to the route.

8. A navigation system for a vehicle, comprising:
a storage medium for storing programs that control components of the navigation system;
a control unit that executes the programs;
an input unit configured to receive an input corresponding to a destination;
a determining unit configured to determine if the input destination corresponds to a water-based route or a rail-based route; and
a route guidance unit configured to search for a guide route on the basis of the input destination, and performs guidance along the guide route, wherein
when the navigation system in the vehicle arrives at the termination of a road linked to the route when it is determined that the input destination is a location on the route, the route guidance unit determines that the vehicle has arrived at the destination and presents a reference route from the termination to the input destination.

9. The system according to claim 8, wherein the termination of the road excludes a road on which vehicle travel is not permitted.

10. The system according to claim 8, wherein the termination of the road excludes a road that intersects a road linked to the route.

11. A method for guidance along a guide route for a navigation system in a vehicle, the method comprising the steps of:
(a) receiving an input destination through a navigation system comprising a storage medium for storing programs that control components of the navigation system and a control unit that executes the programs;
(b) determining whether the input destination corresponds to a location on a water-based route or a rail-based route;
(c) modifying the input destination to a modified destination that corresponds to the termination of a road linked to the route or the vicinity of an arrival terminal or a departure terminal of the route, when it is determined that the input destination corresponds to a location on the route;
(d) searching for a guide route to the modified destination to perform guidance; and
(e) when the navigation system in the vehicle arrives at the termination or the vicinity thereof, or when the vehicle is positioned in the vicinity of the terminal, and the navigation system is turned off, it is determined that the vehicle has arrived at the destination.

12. The method according to claim 11, wherein step (c) further comprises:
comparing a distance from the input destination to a departure terminal of the route with a distance from the input destination to an arrival terminal of the route; and
modifying the input destination to be the termination of a road linked to the closer of the departure terminal or the arrival terminal.

13. A method for guidance along a guide route for a navigation system in a vehicle, the method comprising the steps of:
receiving an input destination through a navigation system comprising a storage medium for storing programs that control components of the navigation system and a control unit that executes the programs;
determining whether the input destination corresponds to a water-based route or a rail-based route;
presenting a selection screen that displays a departure terminal or an arrival terminal of the route, when it is determined that the input destination is a location on the route;
receiving a selection of the departure terminal or the arrival terminal of the route;
modifying the input destination to a modified destination that corresponds to the termination of a road linked to the selected arrival terminal or departure terminal of the route;
searching for a guide route to the modified destination to perform guidance along the guide route; and
when the navigation system in the vehicle arrives at the termination of the road or the vicinity thereof, determining that the vehicle has arrived at the destination.

14. The method according to claim 13, wherein the termination of the road excludes a road on which vehicle travel is not permitted.

15. The method according to claim 13, wherein the termination of the road excludes a road which intersects a road linked to the route.

* * * * *